United States Patent [19]

Kinas

[11] 3,980,118

[45] Sept. 14, 1976

[54] TREAD CONFIGURATION FOR AUTOMOTIVE TIRE

[75] Inventor: Kenneth P. Kinas, Green Lake, Wis.

[73] Assignee: The General Tire & Rubber Company, Akron, Ohio

[22] Filed: May 5, 1975

[21] Appl. No.: 574,789

[52] U.S. Cl............................................. 152/209 R
[51] Int. Cl.². ........................................ B60C 11/06
[58] Field of Search ...................... 152/209, 209 R

[56] References Cited
UNITED STATES PATENTS

| | | | |
|---|---|---|---|
| 2,661,041 | 12/1953 | Walsh | 152/209 R |
| 3,768,535 | 10/1973 | Holden | 152/209 R |
| D177,655 | 5/1956 | Wolfer | 152/209 D |

Primary Examiner—Drayton E. Hoffman

[57] ABSTRACT

A vehicular tire having a tread configuration that provides a cornering stiffness in one axial direction that is greater than the cornering stiffness in the opposite axial direction. The difference derives from an asymmetrical configuration of the tread. The tread is provided with a plurality of circumferential ribs that define circumferential grooves therebetween, the ribs having walls on one side that define a relatively flat continuous surface facing in one axial direction to provide a relatively rigid rib edge and on the side that faces in the opposite axial direction, an irregular configuration to provide a rib edge of less rigidity.

3 Claims, 5 Drawing Figures

TREAD CONFIGURATION FOR AUTOMOTIVE TIRE

BACKGROUND OF THE INVENTION

This invention relates to pneumatic tires for automotive vehicles and especially to the road engaging tread portion of the tire. More particularly the invention relates to a tire tread configuration that permits the particular orientation of the various identical tires on a vehicle to be so selected as to provide an advantageous differential in cornering stiffness between the outside front and rear tires.

Certain vehicles (some station wagons, for example) have a tendency to yaw when subjected to quick lane changes at highway speeds. This tendency to yaw may be accentuated by weight distribution, suspension and tire characteristics, etc.

Experimentation has shown that yawing can be minimized by placing tires on the rear which have a larger cornering stiffness than the tires on the front.

One method of achieving this result is to underinflate the tires at the front or conversely to overinflate the tires at the rear. This technique, however, results in excessive wear and/or a decrease in riding comfort.

The tire tread configuration of the present invention provides, when the vehicle tires are properly oriented, increased cornering stiffness of the tires at the rear as compared with the tires at the front, and thus minimizes vehicle yaw.

SUMMARY OF THE INVENTION

It is among the objects of the invention to provide improved resistance to yaw in conventional automotive vehicles.

Another object is to provide a pneumatic tire tread configuration that permits tires mounted on the front end of the vehicle to have a different cornering stiffness during maneuvers than those mounted at the rear end of the vehicle when the tires are properly oriented.

These and other objects are accomplished utilizing the unique tire tread configuration of the invention which results in a tire having a different cornering stiffness in one axial direction than in the opposite axial direction. Accordingly, the tires mounted on the front end of the vehicle may be oriented so that in turn, the outside front tire has a lower cornering stiffness than the outside rear tire which is mounted in the reverse orientation. This differential between cornering stiffness of the outside front tire as compared with the outside rear tire lessen the tendency of the vehicle to yaw. Extraordinary measures such as the use of different inflation pressures, etc., can therefore be avoided.

In accordance with the invention the tread portion of the tire is provided with a plurality of circumferential ribs that define circumferential grooves therebetween. The ribs have flat continuous sides facing in one axial direction to provide a relatively rigid edge at one side of the rib and sides facing in the opposite axial direction that define an irregular configuration to provide an edge with less rigidity at the other side of the rib.

Accordingly, the resulting tire has under normal inflation conditions a greater cornering stiffness in the first axial direction than in the opposite axial direction.

DESCRIPTION OF THE PREFERRED EMBODIMENT

Figure 1:
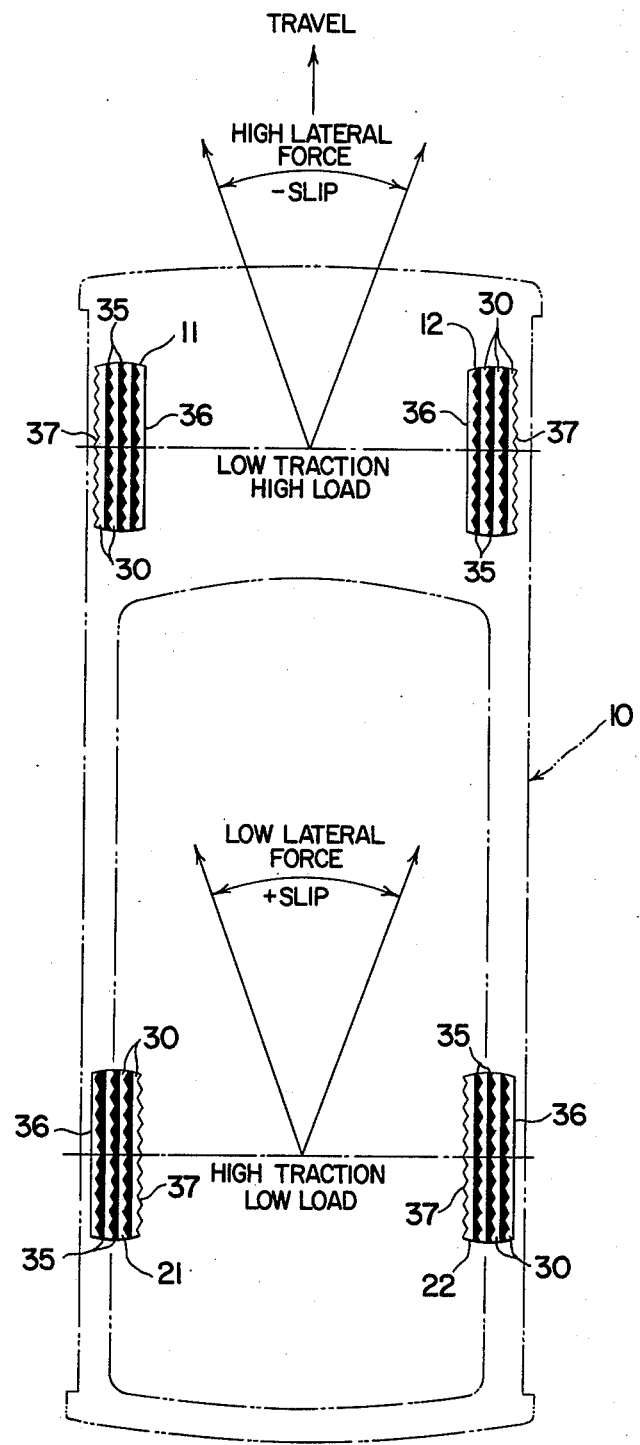
FIG. 1 is a diagrammatic view depicting in dashed lines, an automotive vehicle in outline form and in solid lines the location and orientation of the four vehicle tires as viewed from above.

Referring more particularly to the drawings and initially to FIG. 1, there is shown in dashed lines the outline of a vehicle 10 of typical design having the vehicle engine located at the front end. The vehicle 10 has left front and right front tires 11 and 12 respectively constructed in accordance with the invention and mounted on their respective wheel rims in a particular orientation to achieve the unique advantages of the invention. The vehicle 10 also has left and right rear tires 21 and 22 respectively which are mounted in the reverse orientation from that of the tires 11 and 12 at the front end, to achieve the unique advantages of the invention.

Figure 2:
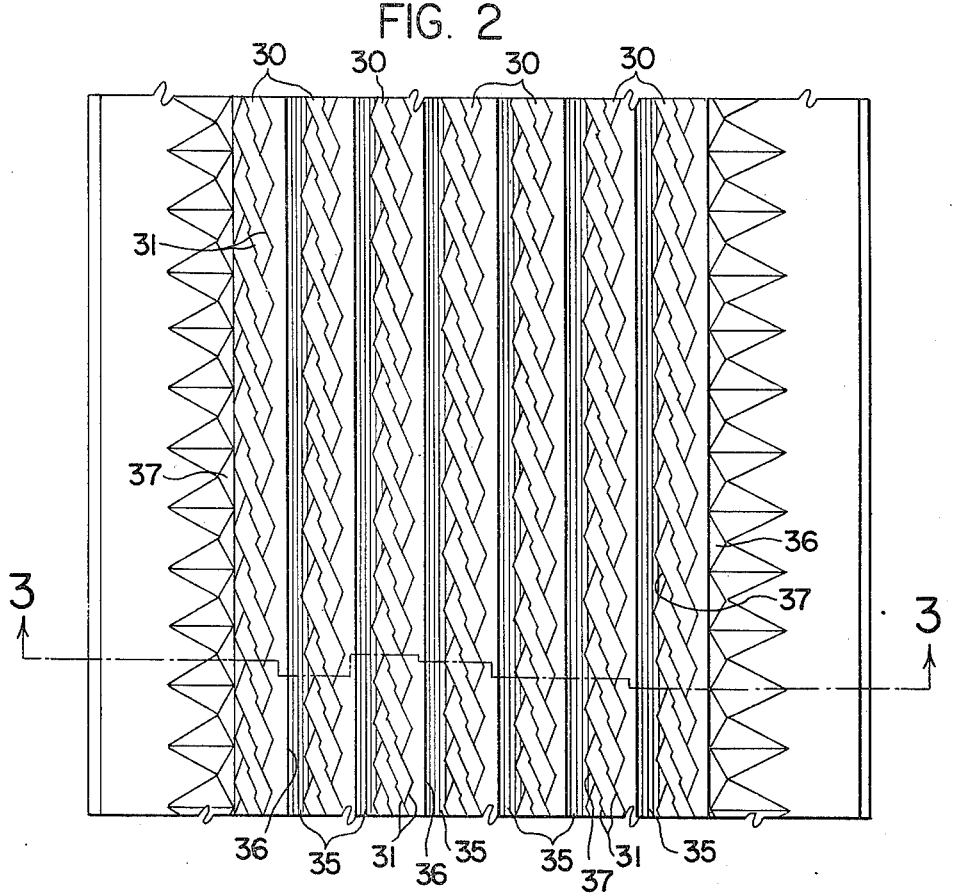
FIG. 2 is a fragmentary elevational view illustrating a portion of a tire tread configuration in accordance with the invention.
Figure 3:
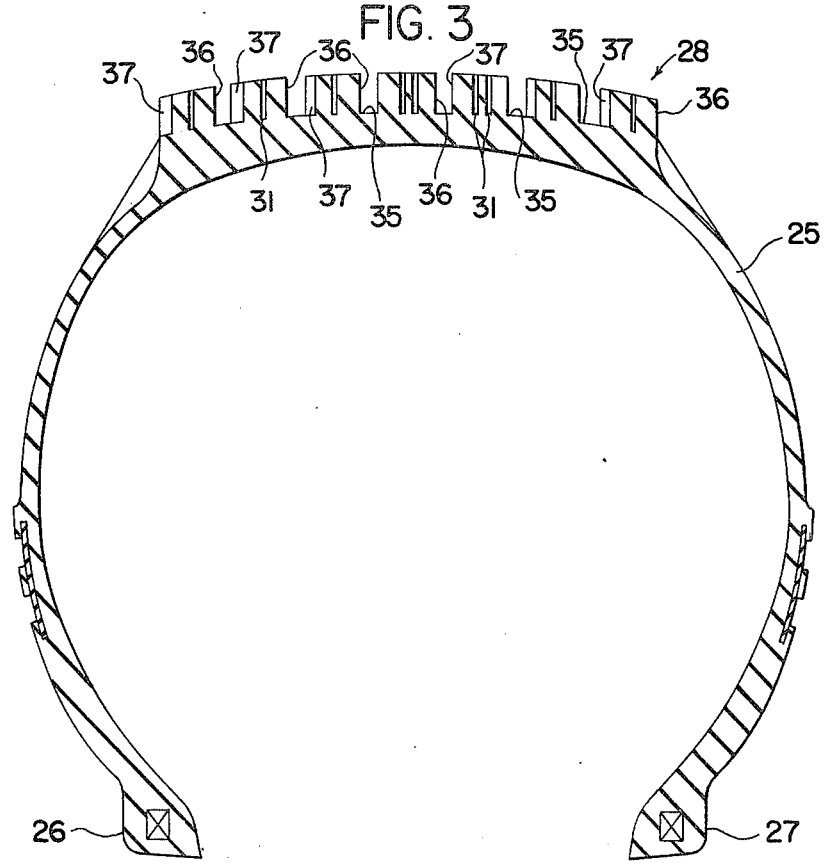
FIG. 3 is a sectional view taken on the line 3—3 of FIG. 2.

FIGS. 2 and 3 illustrate the unique tread configuration of the tires 11, 12, 21 and 22. For the purpose of discussion, however, it will be assumed that the tire illustrated is the left front tire 11. The tire 11 has a toroidal carcass portion 25 of conventional construction terminating in annular beads 26 and 27 reinforced with metal bead rings, and a circumferential tread portion 28 embodying the unique tread configuration of the invention.

The tread portion has seven circumferential ribs 30 defining the ground engaging surface portions of the tread and having sipes 31 cut therein in a desired pattern as is customary in the art. The ribs 30 define circumferential grooves 35 therebetween. Each of the ribs 30 has a pair of walls 36 and 37, the wall 36 facing in the right hand direction as viewed in FIGS. 2 and 3 and the wall 37 facing in the left hand direction as viewed in FIGS. 2 and 3. The wall 36 defines a flat continuous surface in a circumferential plane of the tire 11 and provides a relatively rigid edge of the rib 30. The wall 37 has an irregular zigzag or saw tooth shape and provides an edge of lesser rigidity. This difference in edge rigidity between opposite edges of the ribs results in a greater cornering stiffness for the tire in one axial direction than in the other.

This unique directional differential in the cornering stiffness of the tires 11, 12, 21 and 22 can be used to great advantage in reducing yawing as illustrated in FIG. 1. Referring to FIG. 1 it will be seen that the front tires 11 and 12 are mounted with their walls 36 (and thus the straight edges of their ribs 30) facing in the inward direction whereas the rear tires 21 and 22 are mounted with the irregular zig-zag walls 37 facing in the inward direction. The result of this is that the outside rear tire (in a turn) has a greater cornering stiffness than the respective outside front tire and this minimizes yawing.

The results achieved with the tire tread configuration illustrated in FIGS. 2 and 3 will be more readily understood from the following example.

EXAMPLE

A pneumatic tire having a tread configuration formed as illustrated in FIGS. 2 and 3 was prepared for cornering stiffness testing. The tire had a 15 inch diameter, a tread width of 7.8 inches, and was formed of polyester carcass cords and a fiberglass reinforcing belt. The tire was mounted on a rim and inflated to a pressure of 26 psi.

In this configuration the tire was tested on a conventional lateral force testing machine according to standard lateral force testing procedures. The tire was first tested for turning in one direction and then in the opposite direction so that slip angles in both directions were encountered.

Figure 4:
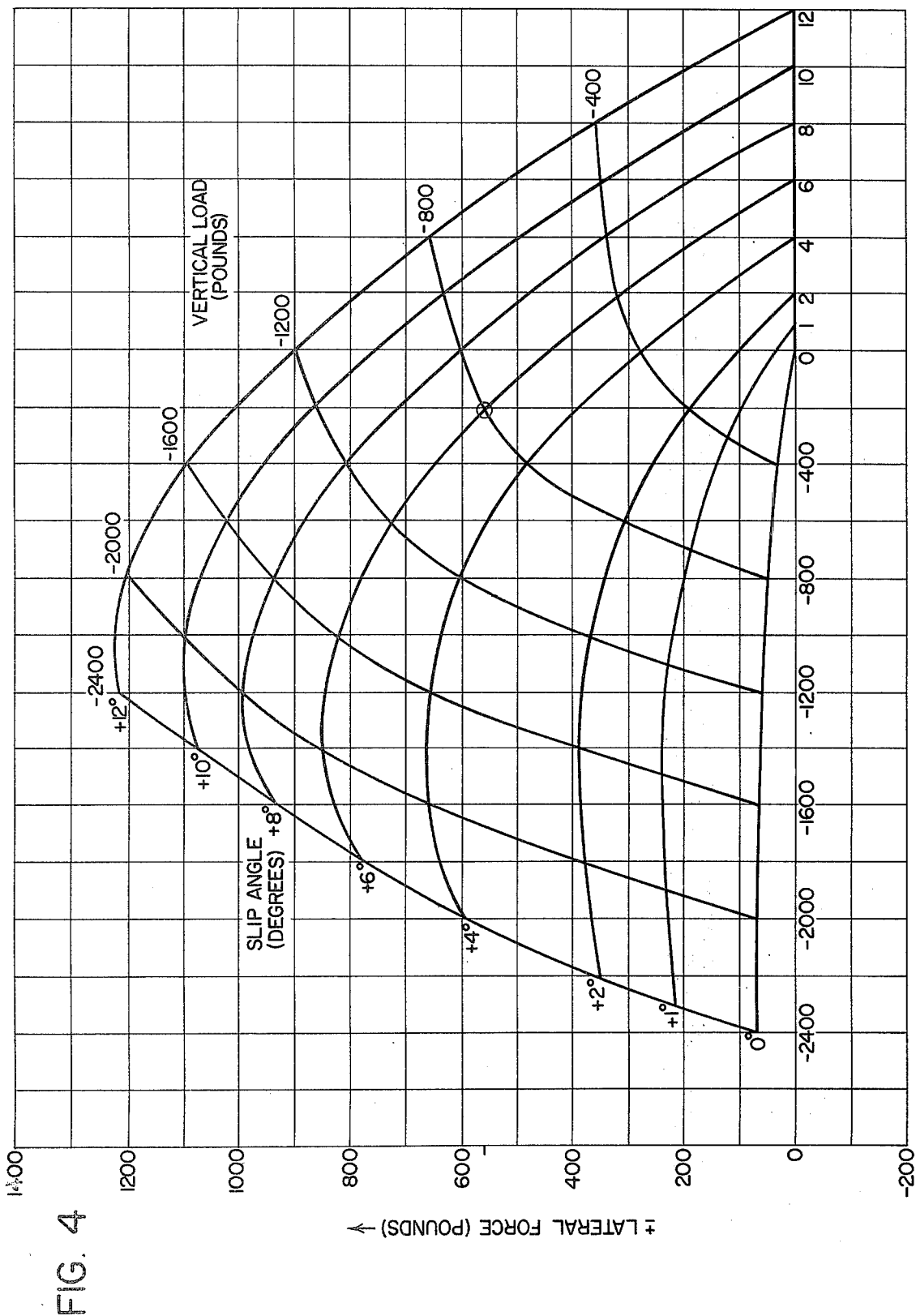
FIGS. 4 and 5 are charts showing the plot of lateral force versus slip angle at various wheel loadings for a pneumatic tire with a tread configuration embodying the invention.
Figure 5:
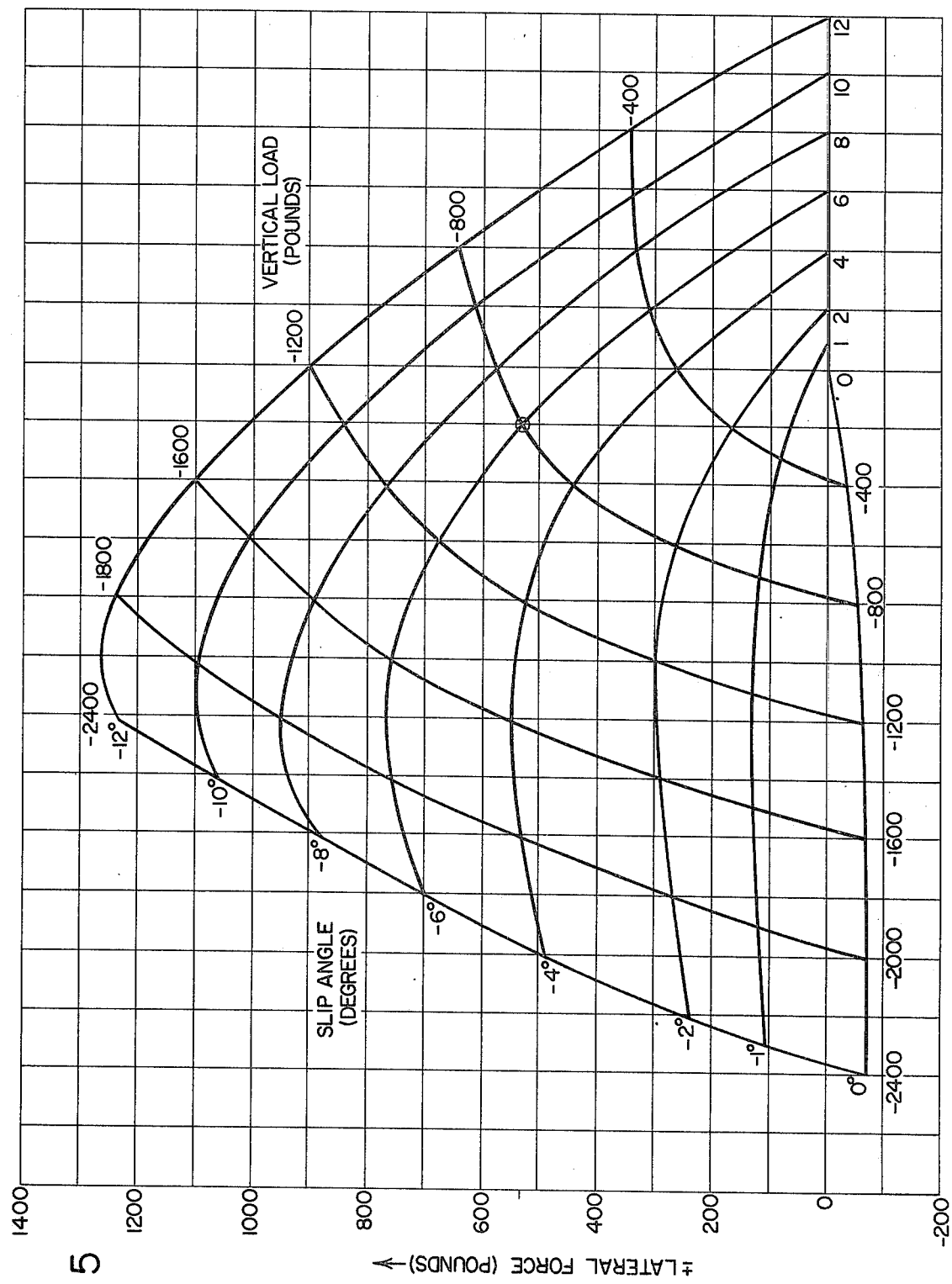

The results of the tests are indicated in FIGS. 4 and 5 which illustrate the plot of lateral force versus slip angles between 0° and 12° at various wheel loadings from 400 to 2400 pounds. It will be noted for example, that at a wheel loading of 800 pounds and a slip angle of 6°, the lateral force generated when the tire turned in one direction was about 20 pounds greater than that developed when the tire turned in the opposite direction. Similar differentials in lateral force resulted at other typical wheel loadings and slip angles.

The conclusion is that making one wall of the circumferential ribs more irregular than the other wall or in other words making one rib edge more rigid than the other rib edge changes the cornering stiffness of the tire in the particular axial direction and may be used advantageously to reduce yaw by proper orientation of the rear tires as compared with the front tires.

While the invention has been shown and described with respect to a specific embodiment thereof, this is intended for the purpose of illustration rather than limitation and other variations and modifications of the specific embodiment herein shown and described will be apprent to those skilled in the art all within the intended spirit and scope of the invention. Accordingly, the patent is not to be limited in scope and effect to the specific embodiment herein shown and described nor in any other way that is inconsistent with the extent to which the progress in the art has been advanced by the invention.

I claim:

1. In a pneumatic tire having a tread portion including a plurality of circumferential ribs, said ribs defining circumferential grooves therebetween, the improvement wherein said ribs each have a relatively flat continuous side facing in one axial direction to provide a relatively rigid edge of the rib, and sides facing in the opposite axial direction defining an irregular configuration to provide an edge of the rib with less rigidity than the other edge whereby said tire has under normal inflation conditions, a greater cornering stiffness in one axial direction than in the opposite axial direction.

2. A pneumatic tire as defined in claim 1 wherein said sidewalls of said ribs facing in said opposite axial direction have a zig-zag configuration.

3. In a four-wheeled automotive vehicle having a tendency to yaw the improvement which comprises:
    four essentially identical pneumatic tires mounted on said wheels and including two front tires and two rear tires, each of said tires having a tread portion including a plurality of circumferential ribs, said ribs defining circumferential grooves therebetween, said ribs having relatively continuous flat sides in planes facing in one axial direction to provide a relatively rigid edge of the rib and sides facing in the opposite axial direction defining an irregular configuration to provide an edge of the rib with less rigidity than the other edge whereby said tires have under normal inflation conditions, a greater cornering stiffness in one direction than in the opposite direction, said front tires having the irregular sides of their ribs facing outwardly from said vehicle and said rear tires having the continuous flat sides of their ribs facing outwardly from said vehicle.

* * * * *